C. B. REDWAY.
BOOKKEEPING ENTRY SHEET.
APPLICATION FILED APR. 19, 1918.

1,292,878.

Patented Jan. 28, 1919.

INVENTOR
Charles B. Redway
by Macleod, Calver, Copeland & Dike
ATTYS

UNITED STATES PATENT OFFICE.

CHARLES B. REDWAY, OF LOWELL, MASSACHUSETTS.

BOOKKEEPING ENTRY-SHEET.

1,292,878.  Specification of Letters Patent.  Patented Jan. 28, 1919.

Application filed April 19, 1918. Serial No. 229,520.

*To all whom it may concern:*

Be it known that I, CHARLES B. REDWAY, a citizen of the United States, residing at Lowell, in the county of Middlesex, State of Massachusetts, have invented a certain new and useful Improvement in Bookkeeping Entry-Sheets, of which the following is a specification, reference being had therein to the accompanying drawings.

My invention has for its object a new and improved bookkeeping entry sheet embodied in a single page, or pair of pages in a book, or a loose leaf. One part of the page or loose leaf, or one page of a pair of pages is arranged to receive cash book and journal entries and the other is arranged to receive the corresponding ledger entries, the whole being visible at one time. The bookkeeping entry sheet embodying my invention is particularly adapted for use as a master ledger to which are transferred the final totals, details of which are kept in other books of account, but it is capable of use for other purposes and may be conveniently employed when it is desirable to have all the entries relating to a group or class of transactions visible at once.

The bookkeeping entry sheet embodying my invention has certain very important advantages. It greatly lessens the amount of work to be performed by the bookkeeper since the dates and script portion of the entries are written but once, also, the detection of errors may be effected with less effort than heretofore. Any error which may have been made on one sheet will be found when a new sheet is begun because the old sheet will not balance if there is an error on it.

In the following description, I have referred to the sheet as composed of a left hand and right hand page, the left hand page being used for cash book and journal entries and the right hand page for the corresponding ledger entries. While this is a convenient arrangement, I do not limit myself to it as the relative position of the cash book journal part of the page to the ledger part of the page may be varied according to the character of the entries to be made therein.

In the accompanying drawing I have shown my invention as embodied in a sheet for use by an insurance company as that is the form in which I have actually put my invention into practical use.

The invention will be fully understood when taken in connection with the accompanying drawings and the novel features thereof will be pointed out and clearly defined in the claims at the close of this specification.

The drawing is a plan view of a sheet embodying my invention.

Referring now to the drawings, at $a$ is shown a sheet separated into portions which for convenience may be referred to as right hand and left hand pages, the dividing line being indicated at $b$. Of these pages the left hand is employed for cash book and journal entries and the right hand is for the corresponding ledger entries. The sheet is provided with entry lines $c$ running all the way across both pages. At the extreme left of the sheet, are placed date columns $e$ and $f$; next to them come debit and credit entry columns $g$ in which the script entries are placed. In the next column $d$ is placed a series of consecutive numerals beginning with 1 designating each entry line. These numerals are conveniently referred to as index characters since letters or other characters may be employed if desired. Adjacent the column $d$, are two columns $h$, in which are placed ledger index characters the use of which will be described hereafter. Next adjacent the ledger index columns $h$, are columns $i, j$ and $k$ for debit, credit and balance entries respectively. These columns are followed by a pair of debit and credit columns $l$ and $m$ headed Journal in which journal entries are made.

The ledger page on the right consists of a series of blocks each comprising a pair of debit and credit columns $n$ and $o$ and a pair of line index columns $p$. The use of these line index columns $p$ will be explained hereafter. Some of the ledger blocks are also provided with a column $r$ headed P in which page numbers are placed when entries are made which are brought forward from a preceding page or sheet. This column is provided only on those ledger blocks in which entries brought forward from preceding pages are likely to be made. No date columns are provided in the ledger blocks because, as will be explained, none are needed.

The various ledger blocks are given appropriate headings as for instance Lost policies, Office payments, Bonds, Banks, etc., there being as many ledger blocks as there are ledger accounts to which items from the cash book and journal are to be posted. In the form shown in the drawings, some of the ledger blocks are for master accounts such as those previously mentioned, while other as for instance those headed, Refund, Certified copies, Miscellaneous and Remittance are wholly or in part original and not master accounts, that is to say the original entries are made in respective ledger blocks instead of in some other books from which the total is entered in the ledger blocks as is the case with what I have termed a master account.

Each ledger block has given to it a ledger index character as shown at $q$.

Some of the ledger blocks are arranged in columns with their debit and credit columns in alinement. This assists in obtaining the totals. In the form shown in the drawing the ledger blocks are all less than a column in length and are arranged in four columns. In each of the first three columns there are six ledger blocks while in the last column there are but four ledger blocks.

In using my improved bookkeeping system written entries are made in columns $g$ and the date placed in columns $e$ and $f$. The entries in columns $g$ are the usual cash book or journal entries explaining what the payments, receipts, charges or credits are for. In the column $d$ appears the line number. In the next column $h$ is placed the ledger index character indicating the ledger block on the ledger page in which the entry is posted. For instance the entry on line 4 in column $g$ records the total amounts received from collections from policies known as ordinary policies, the details of these payments being kept in a separate book of account. Accordingly the letter D appears opposite the entry in the ledger index column to show that the entry is posted to ledger block D in which account is kept the totals of ordinary collections. A corresponding entry is made in ledger block D and the figure 4 is placed in the line index column of that ledger block to indicate that the entry originated on line 4 of the cash book-journal page. In this way any one examining the sheet can see at a glance to what ledger account any entry on the left hand side of the page is posted or can find the line in the cash book-journal from which a given entry in the ledger has been posted.

The procedure in the case of journal entries is similar. When a journal entry is made, the index character of the ledger block from which it is posted is placed in the left hand column $h$, and the index character of the column to which it is posted is placed in the right hand column $h$ the proper entry being made in the corresponding debit and credit columns of the journal account. The corresponding ledger entries include proper line numbers showing the line in the cash book journal where the corresponding entry is found.

By this arrangement it is possible to make a cash book or journal entry and a corresponding ledger entry without writing the date or the descriptive matter more than once. All of this is a great saving of time to the bookkeeper but it in no way detracts from the usefulness of the book because the line index characters and the ledger index characters enable the bookkeeper to trace any item instantly.

To balance the sheet, the respective totals of all the credit and debit entries in all the ledger blocks are taken and the difference between the totals is obtained. In the same way the difference is found between the totals of the debit and credit entries in the cash book column. If the sheet is in balance the cash on hand will balance the account. The journal entries do not require to be taken into consideration as they automatically balance themselves. In practice, however it is generally more convenient to balance each ledger block separately obtaining thereby for each account which is not in balance what is conveniently referred to as a red ink balance and is shown in the drawings by being placed in a parenthesis. The totals of these red ink balances are then taken and the difference between the total credits and total debits will be balanced by the cash on hand. These red ink balances will be carried forward onto the new sheet when the next sheet is begun.

What I claim is:

1. The bookkeeping entry sheet appropriately ruled and designated to form a pair of debit and credit columns for journal entries and adjacent thereto a plurality of delineated ledger blocks each provided with a pair of delineated debit and credit columns for ledger entries, the whole being visible at one time.

2. The bookkeeping entry sheet appropriately ruled and designated to form a pair of debit and credit columns, the lines of which are designated by an index character, and a plurality of delineated ledger blocks each ledger block being composed of a pair of delineated debit and credit columns and being given an index character, the entry lines of said first mentioned pair of debit and credit columns being provided with spaces to receive the index characters of the entry blocks to which the entry on the said line is posted and the lines of the said ledger blocks being provided with spaces to receive the index characters of the lines of the debit and credit columns from which the entries in the ledger blocks are posted.

3. The bookkeeping entry sheet appropriately ruled and designated to form a double page one part of which is provided with a pair of delineated debit and credit columns for journal entries and the other part of which is provided with a plurality of delineated ledger blocks for ledger entries each of said blocks being each furnished with a pair of delineated debit and credit columns, an index character designating each line of the first mentioned part of the page, an index character designating each ledger block, each line of said first part of the page being provided with a space to receive the index character of the ledger block to which the entry on that line is posted and each line of each ledger block being provided with a space to receive the index character of the line in the first part of the page from which the entry is posted.

4. The bookkeeping entry sheet appropriately ruled and designated to form a double page one part of which is provided with a pair of delineated debit and credit columns for journal entries and the other part of which is provided with a plurality of delineated ledger blocks for ledger entries each of said blocks being furnished with a pair of delineated debit and credit columns, an index character designating each filled line of the first mentioned part of the page, an index character designating each ledger block, each line of said first part of the page having a character like the index character of the ledger block to which the entry contained in said line is posted and each filled line of said ledger blocks having an index character therein like the index character of the line from which the entry contained therein is posted.

5. The bookkeeping entry sheet appropriately ruled and designated to form a double page one part of which is provided with a pair of delineated debit and credit columns for journal entries and the other part of which is provided with a plurality of delineated ledger blocks for ledger entries each of said blocks being furnished with a pair of delineated debit and credit columns, an index character designating each filled line of the first mentioned part of the page, an index character designating each ledger block, each line of said first part of the page having a character like the index character of the ledger block to which the entry contained in said line is posted and each filled line of said ledger blocks having an index character therein like the index character of the line from which the entry contained therein is posted, the debit and credit columns of some of said ledger blocks being in line, so that the account may be balanced by comparing the totals of the entries in the debit and credit columns of the first part of the page with the total of all the entries in the ledger blocks on the other side of the page.

In testimony whereof I affix my signature.

CHARLES B. REDWAY.